US012580685B2

(12) United States Patent
Lei

(10) Patent No.: US 12,580,685 B2
(45) Date of Patent: Mar. 17, 2026

(54) DETERMINING NUMBER OF REPETITION TRANSMISSIONS FOR DATA TRANSMISSION BASED ON REPETITION TRANSMISSION NUMBER INFORMATION

(71) Applicant: SPREADTRUM SEMICONDUCTOR (NANJING) CO., LTD., Nanjing (CN)

(72) Inventor: Zhenzhu Lei, Shanghai (CN)

(73) Assignee: SPREADTRUM SEMICONDUCTOR (NANJING) CO., LTD., Nanjing (CN)

( * ) Notice: Subject to any disclaimer, the term of this patent is extended or adjusted under 35 U.S.C. 154(b) by 392 days.

(21) Appl. No.: 18/033,019

(22) PCT Filed: Oct. 25, 2021

(86) PCT No.: PCT/CN2021/125936
§ 371 (c)(1),
(2) Date: Apr. 20, 2023

(87) PCT Pub. No.: WO2022/083775
PCT Pub. Date: Apr. 28, 2022

(65) Prior Publication Data
US 2023/0388053 A1 Nov. 30, 2023

(30) Foreign Application Priority Data
Oct. 23, 2020 (CN) .......................... 202011148833.4

(51) Int. Cl.
*H04W 24/06* (2009.01)
*H04L 1/08* (2006.01)
(Continued)

(52) U.S. Cl.
CPC ............... *H04L 1/08* (2013.01); *H04W 72/12* (2013.01); *H04W 72/232* (2023.01); *H04W 76/20* (2018.02); *H04W 74/0833* (2013.01)

(58) Field of Classification Search
CPC ........... H04L 1/08; H04L 5/00; H04L 5/0053; H04W 76/20; H04W 72/232;
(Continued)

(56) References Cited

U.S. PATENT DOCUMENTS

2016/0165640 A1 6/2016 Yang et al.
2016/0338110 A1 11/2016 Wang et al.
(Continued)

FOREIGN PATENT DOCUMENTS

CN 104780549 A 7/2015
CN 104852787 A 8/2015
(Continued)

OTHER PUBLICATIONS

International Search Report corresponding to International Application No. PCT/CN2021/125936; Mailing Date, Jan. 25, 2022.
(Continued)

*Primary Examiner* — Mewale A Ambaye
(74) *Attorney, Agent, or Firm* — CANTOR COLBURN LLP

(57) ABSTRACT
A data repetition transmission method and apparatus, a storage medium, a terminal and a base station are provided. The method includes: determining a number of repetition transmissions for data transmission based on repetition transmission number information statically or semi-statically configured by a network; and performing data transmission with the network using the determined number of repetition transmissions.

8 Claims, 3 Drawing Sheets

S401 a network configures repetition transmission number information statically or semi-statically for a UE, to make the UE determine a number of repetition transmissions for data transmission based on the repetition transmission number information, and perform data transmission with a network using the determined number of repetition transmissions

(51) Int. Cl.
| | |
|---|---|
| *H04W 72/12* | (2023.01) |
| *H04W 72/232* | (2023.01) |
| *H04W 76/20* | (2018.01) |
| *H04W 74/0833* | (2024.01) |

(58) Field of Classification Search
CPC . H04W 72/12; H04W 74/0833; H04W 72/20; H04W 28/065; H04W 28/10
See application file for complete search history.

(56) References Cited

U.S. PATENT DOCUMENTS

| | | | | |
|---|---|---|---|---|
| 2017/0318487 | A1* | 11/2017 | Yamamoto | H04W 24/06 |
| 2019/0045552 | A1* | 2/2019 | Blankenship | H04W 72/21 |
| 2020/0288408 | A1 | 9/2020 | Su et al. | |
| 2020/0314817 | A1* | 10/2020 | Sun | H04W 72/23 |
| 2020/0358557 | A1 | 11/2020 | Park et al. | |
| 2021/0022158 | A1* | 1/2021 | Wei | H04L 1/08 |
| 2024/0187136 | A1* | 6/2024 | Nishio | H04L 1/08 |
| 2024/0251444 | A1* | 7/2024 | Takahashi | H04L 1/08 |
| 2025/0008494 | A1* | 1/2025 | Jang | H04L 5/0094 |

FOREIGN PATENT DOCUMENTS

| | | | |
|---|---|---|---|
| CN | 104901782 | * | 9/2015 |
| CN | 104901782 | A | 9/2015 |
| CN | 105493417 | A | 4/2016 |
| CN | 108886435 | A | 11/2018 |
| CN | 110831212 | A | 2/2020 |
| CN | 110958085 | A | 4/2020 |
| CN | 111092695 | A | 5/2020 |
| EP | 3857801 | A1 | 4/2020 |
| WO | 2019095307 | A1 | 5/2019 |

OTHER PUBLICATIONS

ZTE, "Support for transmission in preconfigured UL resources for MTC", 3GPP TSG RAN WG1 Meeting #99, R1-1912410, Nov. 18-22, 2019, 9 pages.
SIPO 1st Office Action for corresponding CN Application No. 202011148833.4; Issued Sep. 23, 2024.
SIPO the Second Office Action for corresponding CN Application No. 202011148833.4 Issued on May 9, 2025.

* cited by examiner

_／S301 a terminal determines a number of repetition transmissions for data transmission based on repetition transmission number information statically or semi-statically configured by a network

_／S302 the terminal performs data transmission with the network using the determined number of repetition transmissions

FIG. 3

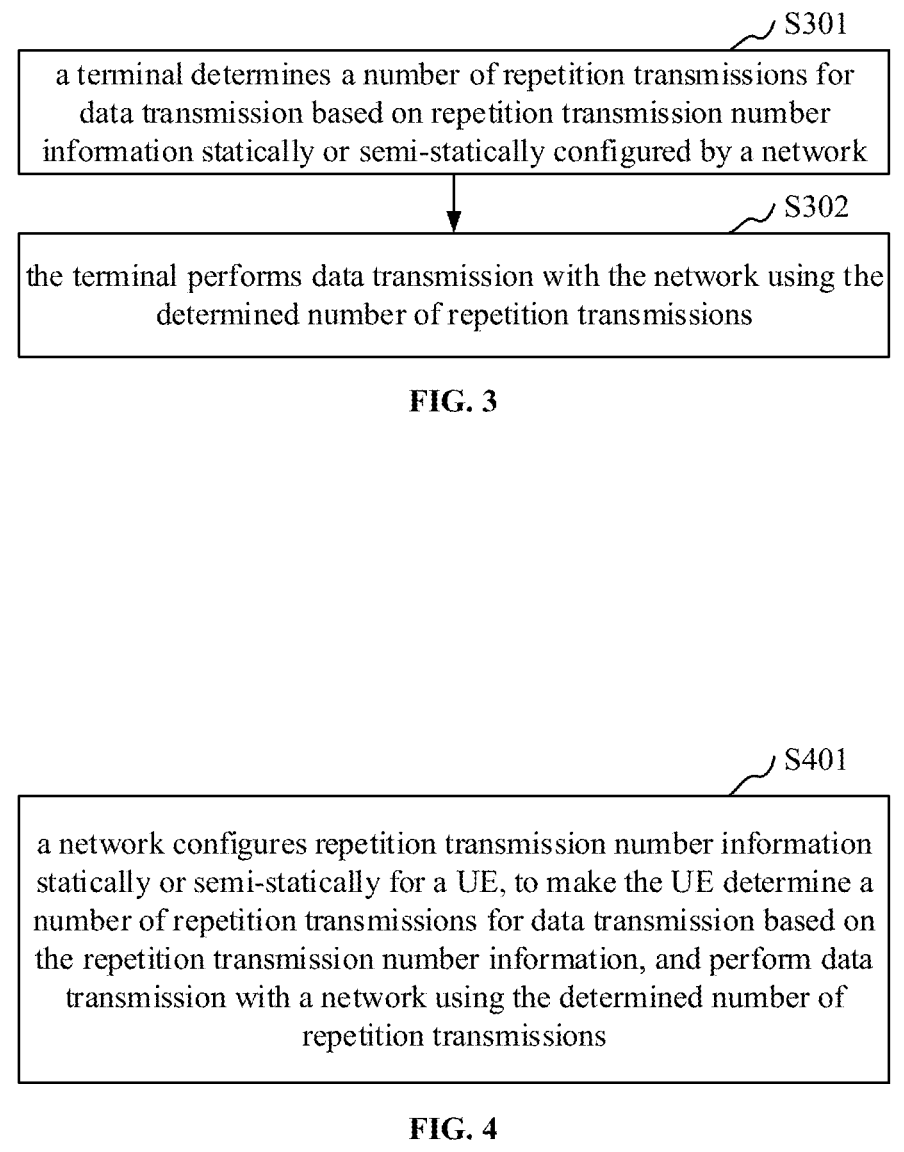

_／S401 a network configures repetition transmission number information statically or semi-statically for a UE, to make the UE determine a number of repetition transmissions for data transmission based on the repetition transmission number information, and perform data transmission with a network using the determined number of repetition transmissions

FIG. 4

DETERMINING NUMBER OF REPETITION TRANSMISSIONS FOR DATA TRANSMISSION BASED ON REPETITION TRANSMISSION NUMBER INFORMATION

CROSS-REFERENCE TO RELATED APPLICATIONS

This is the U.S. national stage of application No. PCT/CN2021/125936, filed on Oct. 25, 2021. Priority under 35 U.S.C. § 119(a) and 35 U.S.C. § 365(b) is claimed from Chinese Application No. 202011148833.4, filed Oct. 23, 2020, the disclosure of which is also incorporated herein by reference.

TECHNICAL FIELD

The present disclosure generally relates to communication technology field, and more particularly, to a data repetition transmission method and apparatus, a storage medium, a terminal and a base station.

BACKGROUND

As shown in FIG. 1, FIG. 1 illustrates a schematic diagram of signal reception corresponding to different geographical locations within a cell/beam coverage in exiting techniques, where (a) is a terrestrial network scenario and (b) is a satellite communication scenario. In the terrestrial network scenario (please refer to FIG. 1(a)), signal strength received by a User Equipment (UE) close to a base station (gNB) (i.e. Near-UE) and signal strength received by a UE far away from the gNB (Far-UE) differ significantly, and are illustrated as points a1 and a2 in FIG. 1(a). That is, in the cell coverage, distances between different geographical locations and the base station are relatively different (corresponding signal quality varies widely). Therefore, when a UE receives/transmits data at different geographical locations (such as a center or an edge of a cell), numbers of data repetition transmissions required for data transmission (i.e., the number of repetition transmissions of Physical Downlink Shared Channel (PDSCH), Physical Uplink Shared Channel (PUSCH), Physical Random Access Channel (PRACH), and Physical Downlink Control Channel (PDCCH)) are different. In current communication systems, PDSCH or PUSCH is scheduled by Downlink Control Information (DCI), and there is a specific bit field in DCI to dynamically indicate the number of repetition transmissions for PDSCH or PUSCH.

In a Non Terrestrial Networks (NTN) scenario, which generally refers to a satellite communication scenario, please refer to FIG. 1(b). Due to a very long distance between satellites and ground, generally a distance between a medium and low orbit satellite and the ground being 300 km to 25000 km, and a distance between a synchronous satellite and the ground being 35786 km, distance differences between different geographical locations within each cell or beam coverage and the satellite is relatively small (that is, a path loss difference of signals corresponding to different geographical locations within the cell or beam coverage is relatively small), which in turn makes signal strength (including downlink reception of UEs and uplink reception of base station) received by the UEs corresponding to different geographical locations (Far-UE and Near-UE) within the cell or beam coverage have very small difference. Respective received signal strength of the UEs are shown as points b1 and b2 in FIG. 1(b). At this time, a network does not need to dynamically indicate the number of repetition transmissions for data transmission (such as PDSCH or PUSCH) for the UEs in real time.

SUMMARY

Embodiments of the present disclosure enable a UE in a connected state to be capable to determine a number of repetition transmissions for data reception/sending without a need for a network to dynamically indicate a number of repetition transmissions for data transmission.

In an embodiment of the present disclosure, a data repetition transmission method is provided, including determining a number of repetition transmissions for data transmission based on repetition transmission number information statically or semi-statically configured by a network; and performing data transmission with the network using the determined number of repetition transmissions.

In an embodiment of the present disclosure, a storage medium having computer instructions stored therein is provided, wherein when the computer instructions are executed, the above method is performed.

In an embodiment of the present disclosure, a terminal including the above apparatus or including a memory and a processor is provided, wherein the memory has computer instructions stored therein, and when the processor executes the computer instructions, any one of the above methods is performed.

BRIEF DESCRIPTION OF THE DRAWINGS

FIG. 3 is a flow chart of a data repetition transmission method according to an embodiment;

FIG. 4 is a flow chart of a data repetition transmission method according to an embodiment;

DETAILED DESCRIPTION

Figure 2:
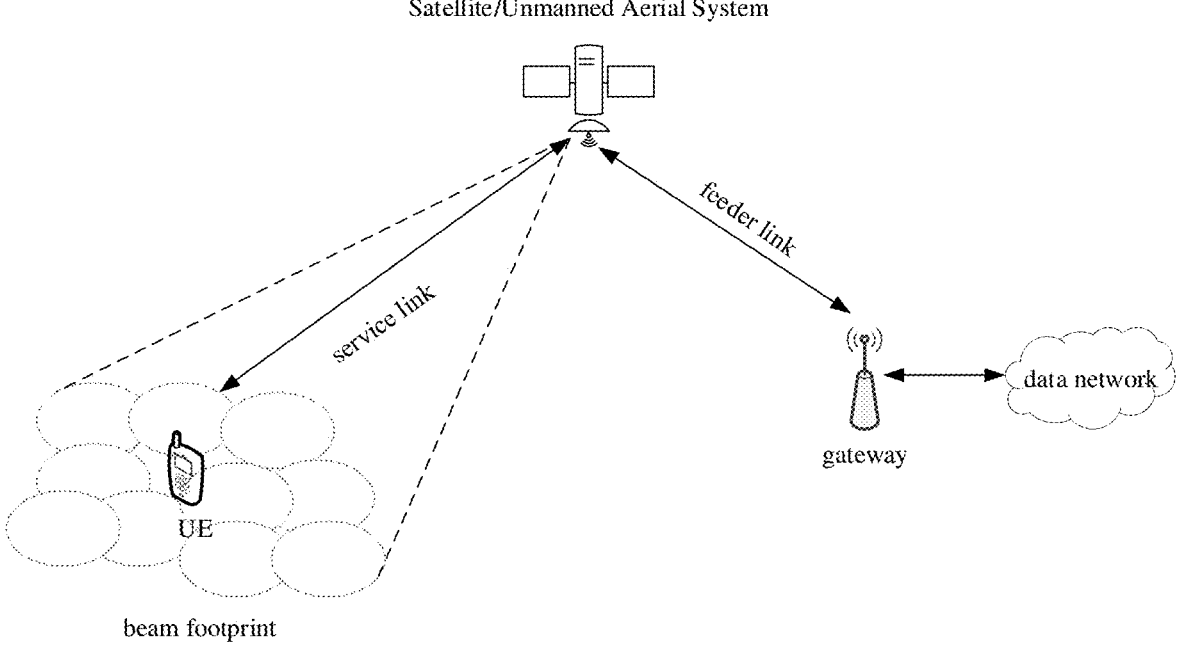
FIG. 2 is a diagram of cells and beams in an NTN scenario in the exiting techniques.

As shown in FIG. 2, FIG. 2 is a diagram of cells and beams in an NTN scenario in the exiting techniques, a satellite/Unmanned Aerial System (UAS) platform and a gateway are connected through a feeder link, and the gateway is connected to a data network. The satellite/UAS system platform sends beams to the ground to form beam footprints each of which is represented by an elliptical area. UEs within the beam footprint can communicate with the satellite/UAS through a service link.

In NTN, one cell may correspond to a plurality of beams, or one cell corresponds to one beam. In practical deployment, one beam footprint may correspond to one cell, or a plurality of beams may correspond to one cell.

In order to guarantee coverage, Narrow Band Internet of Things (NB-IoT)/Enhanced Machine Type Communication (eMTC) uses technology of repetition transmission. A defined maximum number of repetition transmissions for downlink transmission is 2048, and a defined maximum number of repetition transmissions for uplink transmission is 128. A number of actual repetition transmissions of PDSCH/PUSCH is dynamically indicated by its corresponding scheduling DCI using a specific bit field. The UE can determine the number of repetition transmissions of PDSCH/PUSCH according to the DCI. A maximum number (i.e., Rmax) of repetition transmissions of PDCCH is semi-statically configured by Radio Resource Control (RRC)/ System Information Block (SIB).

A Random Access (RA) procedure in NB-IOT is composed of four steps corresponding to transmissions of message 1 (Msg1), message 2 (Msg2), message 3 (Msg3) and message 4 (Msg4).

The step corresponding to Msg1 is that a UE sends a preamble. At present, a maximum number of repetition transmissions sent by Msg1 is 128. Before sending Msg1, the UE acquires a current cell signal through a Narrow-band Reference Signal (NRS). The cell signal can be represented by Reference Signal Received Power (RSRP). The UE compares the measured current cell signal (RSRP) with a relevant threshold value configured by a network to determine a current Coverage Enhancement (CE) level. Different CE levels correspond to different numbers of repetition transmissions of Msg1. The UE can determine the number of repetition transmissions of msg1 according to the determined CE level. If failing in sending Msg1 for the first time, the terminal may upgrade the CE level again (that is, increase the number of repetition transmissions) for retransmission until Msg2 is successfully received or the numbers of repetition transmissions of Msg1 (or PRACH resources) corresponding to all CE Levels are tried.

After receiving Msg1, the base station may instruct the UE to send Msg3 resources and related parameters (including subcarrier indication, a number of repetition transmissions of Msg3, Modulation and Coding Scheme (MCS) indication, etc.). RAR of Msg2 is scheduled by DCI. When receiving Msg2, the UE first receives DCI (the DCI is scrambled by RA-RNTI and indicates transmission parameters of Msg2-RAR (including a position of receiving resources, subcarrier indication, a number of repetition transmissions of Msg3, MCS indication, etc.)), and then receives Msg2-RAR according to the DCI.

The UE sends Msg3 according to related scheduling information of Msg3 indicated by Msg2-RAR. After sending Msg3, the UE may use a unique identifier carried in Msg3 to monitor PDCCH. After successfully decoding the PDCCH, the UE receives corresponding Msg4 according to the DCI carried by the PDCCH. Msg4 is scheduled by the DCI.

As mentioned in the background, in the existing techniques, after the UE enters a connected state, the network dynamically indicates the number of repetition transmissions for data transmission (such as PDSCH/PUSCH) for the UE in real time, such as indicating the number of repetition transmissions of PDSCH/PUSCH through DCI.

In embodiments of the present disclosure, a data repetition transmission method and apparatus, a storage medium, a terminal, and a base station are provided. The data repetition transmission method includes determining a number of repetition transmissions for data transmission based on repetition transmission number information statically or semi-statically configured by a network; and performing data transmission with the network using the determined number of repetition transmissions.

Therefore, a UE in a connected state is capable to determine a number of repetition transmissions for data reception/sending without a need for a network to dynamically indicate a number of repetition transmissions for data transmission.

In order to clarify the objects, characteristics and advantages of the disclosure, embodiments of present disclosure will be described in detail in conjunction with accompanying drawings.

Referring to FIG. 3, FIG. 3 is a flow chart of a data repetition transmission method according to an embodiment. The method may be performed by a terminal (or a UE) and includes S301 and S302.

In S301, a terminal determines a number of repetition transmissions for data transmission based on repetition transmission number information statically or semi-statically configured by a network.

In S302, the terminal performs data transmission with the network using the determined number of repetition transmissions.

In the existing techniques, when a UE and a network perform data transmission, PDSCH/PUSCH is scheduled by DCI, and a number of repetition transmissions of PDSCH/PUSCH is dynamically indicated by the DCI. That is, before each transmission of PDSCH/PUSCH, the number of repetition transmissions of PDSCH/PUSCH needs to be dynamically configured.

In the embodiments of the present disclosure, the network statically/semi-statically configures the repetition transmission number information for the UE, which is opposite to the existing dynamic configuration. Statical/semi-statical configuration indicates that the UE is capable to use the repetition transmission number information configured by the network for multiple times to perform data transmission with the network, instead of the repetition transmission number information being configured by the network before data (such as PDSCH/PUSCH) transmission each time. That is, after the network configures the repetition transmission number information once, the UE can use the repetition transmission number information in multiple transmissions.

Figure 1:
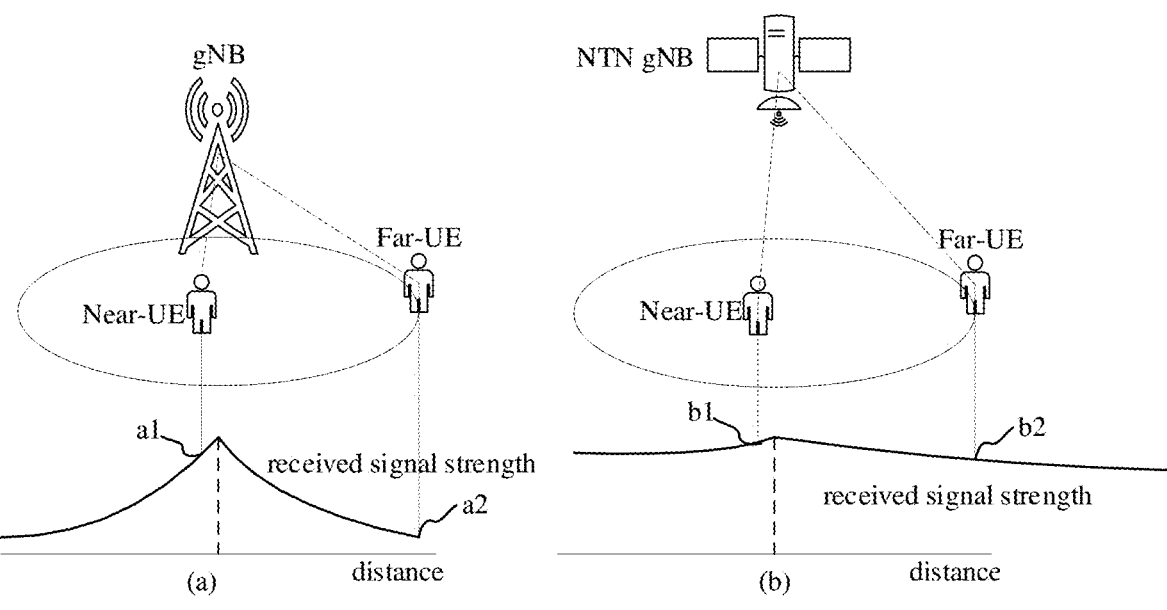
FIG. 1 is a diagram of signal reception corresponding to different geographical locations within a cell/beam coverage in exiting techniques.

Optionally, the method shown in FIG. 3 is applied in an NTN scenario (referring to FIG. 1(b)). In this scenario, distances between a satellite and different geographical positions within a coverage of each cell/beam have relatively small differences, and it is not necessary to dynamically indicate the number of repetition transmissions of PDSCH/PUSCH through DCI. Bits of the DCI for scheduling PDSCH/PUSCH are reduced, and bit length of the reduced DCI may improve robustness of DCI reception. However, due to a relatively long propagation distance between the satellite and the terminal, the UE still needs to perform repetition transmission when receiving/sending data, and requirements on the number of repetition transmissions corresponding to different cells/beams are different. Therefore, the network may statically/semi-statically indicate the number of repetition transmissions of PDSCH/PUSCH.

Based on the data repetition transmission method in FIG. 3, after entering the connected state, the UE can determine the number of repetition transmissions for data reception/sending corresponding to different cells/beams through information indicated by a network statically/semi-statically, and further perform data transmission with the network. Therefore, the network does not need to dynamically indicate the number of repetition transmissions in real time, so as to save control signaling overhead and improve transmission efficiency.

Optionally, the number of repetition transmissions for data transmission includes at least one selected from a number of repetition transmissions of PDSCH, a number of repetition transmissions of PUSCH, and a number of repetition transmissions of PRACH.

That is, the network may configure for the UE the number of repetition transmission of at least one transmission channel selected from PDSCH, PUSCH or PRACH.

In some embodiments, still referring to FIG. 3, before S301, the method may further include: receiving first system information or first RRC signaling, wherein the first system information or the first RRC signaling carries the repetition transmission number information.

Optionally, system information is divided into Master Information Block (MIB) and multiple System Information Blocks (SIBs). The repetition transmission number information may be carried by MIB or SIB, to broadcast to each accessed UE, that is, UEs accessing a same cell receive and use the same repetition transmission number information. In this case, the SIB/MIB carrying the repetition transmission number information is recorded as the first system information.

Further, the first system information may indicate repetition transmission number information corresponding to a current cell, and repetition transmission number information of a coverage corresponding to each beam/beam group of the current cell. That is, the system information may indicate the corresponding repetition transmission number information based on granularity of cell/beam/beam group.

Optionally, the repetition transmission number information may be carried by RRC signaling sent by the network to the UE, which is referred to as first RRC signaling.

The UE may determine the number of repetition transmissions of a coverage corresponding to a current cell, or a current beam, or a current beam group by receiving the first system information (MIB/SIB) or the first RRC signaling, as a determined number of repetition transmissions.

When the number of repetition transmissions of PUSCH/ PDSCH is statically/semi-statically configured by the system information or the first RRC signaling, the network does not need to dynamically indicate the number of repetition transmissions of PUSCH/PDSCH by DCI for scheduling, thereby reducing bits of the DCI and improving robustness of PDCCH reception. Alternatively, bits in the DCI originally used to indicate the number of repetition transmissions of PUSCH/PDSCH may be used to indicate other information.

Optionally, the network may use first system information or first RRC signaling to transmit a number of repetition transmissions of PRACH to the UE.

In a random access procedure of the UE, the UE sends Msg1 directly according to the number of repetition transmissions of PRACH indicated by the first system information (MIB/SIB) or the first RRC signaling. In this case, the number of repetition transmissions of PRACH is directly configured by the first system information or the first RRC signaling, and UE does not need to make determination based on a CE Level. If current Msg1 transmission fails, the UE does not need to try other numbers of repetition transmissions (such as numbers of repetition transmissions of Msg1 corresponding to other CE levels) or use PRACH resources, thereby effectively improving processing efficiency of random access.

In some embodiments, referring to FIG. 3, S301 further includes: receiving a message 4 during a random access procedure, wherein the message 4 carries the repetition transmission number information.

Before entering the connected state, the UE needs to perform a random access procedure. The network uses message 4 (Msg4) to carry the repetition transmission number information after successful random access. The UE determines a subsequent number of repetition transmissions of PDSCH/PUSCH/PRACH (i.e., a number of repetition transmissions of PDSCH/PUSCH/PRACH after entering the connected state) based on receiving Msg4.

Optionally, Msg4 carries a specific Media Access Control Control Element (MAC CE) to indicate the number of repetition transmissions of the subsequent PDSCH/PUSCH/ PRACH.

In some embodiments, the number of repetition transmissions for data transmission is a number of repetition transmissions of PUSCH in the connected state, which is determined based on a number of repetition transmissions of Msg3 during a random access procedure.

Optionally, the number of repetition transmissions for data transmission is a number of repetition transmissions of PDSCH in the connected state, which is determining based on a number of repetition transmissions of a Random Access Response (RAR) message during a random access procedure.

Before entering the connected state, the UE needs to perform a random access procedure. For PUSCH transmission, the number of repetition transmissions of PUSCH in the connected state after the UE completes random access procedure is determined based on the number of repetition transmissions of Msg3 indicated by the RAR message. For example, the number of repetition transmissions of PUSCH in the connected state is twice or half of the number of repetition transmissions of Msg3 or is equal to the number of repetition transmissions of Msg3.

For PDSCH transmission, a number of repetition transmission of PDSCH in the connected state after the UE receives Msg2 is determined based on a number of repetition transmissions of RAR message. For example, the number of repetition transmissions of PDSCH in the connected state is twice or half of the number of repetition transmissions of RAR message or is equal to the number of repetition transmissions of RAR message.

Therefore, the network does not need to dynamically indicate the number of repetition transmissions of PUSCH/ PDSCH by DCI for scheduling, thereby reducing bits of the DCI and improving robustness of PDCCH reception. Alternatively, bits in the DCI originally used to indicate the number of repetition transmissions of PUSCH/PDSCH may be used to indicate other information.

In some embodiments, still referring to FIG. 3, S301 includes: determining a number of repetition transmissions of PDSCH/PUSCH/PRACH based on a maximum number of repetition transmissions of PDCCH, wherein the number of repetition transmissions of PDSCH/PUSCH/PRACH has a mapping relationship with the maximum number of repetition transmissions of PDCCH.

Optionally, prior to determining the number of repetition transmissions of PDSCH/PUSCH/PRACH based on the maximum number of repetition transmissions of PDCCH, the method further includes receiving second system information or second RRC signaling, wherein the second system information or the second RRC signaling carries the mapping relationship.

Optionally, the maximum number of repetition transmissions of PDCCH is carried by third system information or third RRC signaling.

A maximum number of repetition transmissions of PDCCH, i.e., Rmax, is configured by the network through RRC signaling (i.e., third RRC signaling)/system information (i.e., third system information, mainly SIB).

For PDSCH transmission, the UE may determine the number of repetition transmissions of PDSCH based on a value of Rmax configured by the network. Specifically, a correspondence between Rmax and the number of repetition transmissions of PDSCH is predefined. For example, if Rmax=4, the number of repetition transmissions corresponding to PDSCH is 2; and if Rmax=8, the number of repetition transmissions corresponding to PDSCH is 4.

Optionally, the correspondence between Rmax and the number of repetition transmissions of PDSCH may be sent to the UE through second RRC information/second system information, to make the UE determine the number of repetition transmissions of PDSCH based on Rmax configured by third system information (SIB) or third RRC information.

For PUSCH transmission, the UE may determine the number of repetition transmissions of PUSCH based on a value of Rmax configured by the network. Specifically, a correspondence between Rmax and the number of repetition transmissions of PUSCH is predefined. For example, if Rmax=4, the number of repetition transmissions corresponding to PUSCH is 2; and if Rmax=8, the number of repetition transmissions corresponding to PUSCH is 4.

Optionally, the correspondence between Rmax and the number of repetition transmissions of PUSCH may be sent to the UE through second RRC information/second system information, to make the UE determine the number of repetition transmissions of PUSCH based on Rmax configured by third system information (SIB) or third RRC information.

For PRACH transmission, the UE may determine the number of repetition transmissions of PRACH based on Rmax configured by the network. Specifically, a correspondence between Rmax and the number of repetition transmissions of PRACH is predefined. For example, if Rmax=4, the number of repetition transmissions corresponding to PRACH is 2; and if Rmax=8, the number of repetition transmissions corresponding to PRACH is 4.

Optionally, the correspondence between Rmax and the number of repetition transmissions of PRACH may be sent to the UE through second RRC information/second system information, to make the UE determine the number of repetition transmissions of PRACH based on Rmax.

If the network configures the correspondence between Rmax and PDSCH/PUSCH/PRACH through the second system information and configures Rmax through the third system information (SIB), UEs of each access network have consistent understanding of Rmax and the correspondence between Rmax and the number of repetition transmissions of PDSCH/PUSCH/PRACH. In this case, the number of repetition transmissions of PDSCH/PUSCH/PRACH configured by the network for each UE is based on granularity of cell/beam/beam group.

If the network configures the correspondence between Rmax and PDSCH/PUSCH/PRACH through the second RRC signaling or configures Rmax through the third system information (SIB), the network may configure a specific number of repetition transmissions of PDSCH/PUSCH/PRACH for a single UE through the second RRC signaling or the third RRC signaling.

In the embodiments, the network implicitly configures the number of repetition transmissions of PUSCH/PRACH by configuring a maximum number of repetition transmissions of PDCCH, so as to implement static/semi-static configuration of the repetition transmission number information for the UE.

In some embodiments, still referring to FIG. 3, the method further includes: indicating, during transmission of PUSCH, information of TA adjustment using DCI that schedules PUSCH.

When it is unnecessary to indicate the number of repetition transmissions of PUSCH through DCI for scheduling PUSCH, corresponding bits in the DCI may be used to indicate the information of TA adjustment.

In the NTN scenario, due to rapid movement of the satellite relative to the UE (non-synchronous satellite scenario), a propagation delay between the UE and the satellite may change rapidly over time, which may cause frequent uplink out-of-sync. As a result, the UE needs to frequently adjust TA, that is, performing uplink synchronization.

With the embodiments, when PUSCH transmission is performed each time, the DCI for scheduling PUSCH may be used to indicate information of TA adjustment, so as to dynamically implement TA adjustment to adapt to an NTN scenario.

Referring to FIG. 4, FIG. 4 is a flow chart of a data repetition transmission method according to an embodiment. The method includes S401.

In S401, a network configures repetition transmission number information statically or semi-statically for a UE, to make the UE determine a number of repetition transmissions for data transmission based on the repetition transmission number information and perform data transmission with a network using the determined number of repetition transmissions.

Optionally, said configuring repetition transmission number information statically or semi-statically for a UE includes transmitting first system information; or transmitting first RRC signaling to the UE; wherein the first system information or the first RRC signaling carries the repetition transmission number information.

Optionally, said configuring repetition transmission number information statically or semi-statically for a UE includes transmitting a message 4 to the UE during a random access procedure of the UE, wherein the message 4 carries the repetition transmission number information.

Optionally, the number of repetition transmissions for data transmission includes at least one selected from a number of repetition transmissions of PDSCH, a number of repetition transmissions of PUSCH, and a number of repetition transmissions of PRACH.

Optionally, the number of repetition transmissions for data transmission is the number of repetition transmissions of PUSCH in a connected state, and the number of repetition transmissions of PUSCH in the connected state is determined based on a number of repetition transmissions of a message 3 during a random access procedure.

Optionally, the number of repetition transmissions for data transmission is the number of repetition transmissions of PDSCH in a connected state, and the number of repetition transmissions of PDSCH in the connected state is determined based on a number of repetition transmissions of a random access response message during a random access procedure.

Optionally, said configuring repetition transmission number information statically or semi-statically for a UE includes: configuring a maximum number of repetition transmissions of PDCCH for the UE, to make the UE determine a number of repetition transmissions of PDSCH/PUSCH/PRACH based on the maximum number of repetition transmissions of PDCCH, wherein the number of repetition transmissions of PDSCH/PUSCH/PRACH has a mapping relationship with the maximum number of repetition transmissions of PDCCH.

Optionally, the method further includes transmitting second system information; or transmitting second RRC signaling to the UE; wherein the second system information or the second RRC signaling carries the mapping relationship.

Optionally, said configuring a maximum number of repetition transmissions of PDCCH for UE includes transmitting third system information; or transmitting third RRC signaling to the UE; wherein the third system information or the third RRC signaling carries the maximum number of repetition transmissions of PDCCH.

Optionally, the method further includes transmitting DCI to the UE, wherein the DCI is used to schedule PUSCH and indicates information of TA adjustment.

More details of working principles and working modes of the method as shown in FIG. 4 can be referred to related descriptions of the network in the method as shown in FIG. 3, and are not repeated here.

Figure 5:
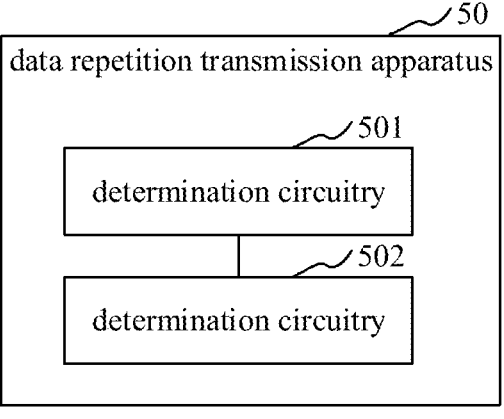
FIG. 5 is a structural diagram of a data repetition transmission apparatus according to an embodiment.

Referring to FIG. 5, FIG. 5 is a structural diagram of a data repetition transmission apparatus 50 according to an embodiment. The apparatus 50 includes a determination circuitry 501 and a data transmission circuitry 502.

The determination circuitry 501 is configured to determine a number of repetition transmissions for data transmission based on repetition transmission number information statically or semi-statically configured by a network.

The data transmission circuitry 502 is configured to perform data transmission with the network using the determined number of repetition transmissions.

More details of working principles and working modes of the apparatus 50 as shown in FIG. 5 can be referred to related descriptions of the method as shown in FIG. 3 and are not repeated here.

In some embodiments, the apparatus 50 may correspond to a chip with a data transmission function in a terminal, or to a chip with a data processing function, such as a System-On-Chip (SOC) or a baseband chip, or to a chip module including a chip with a data transmission function in the terminal, or to a chip module including a chip with a data processing function, or to the terminal.

Figure 6:
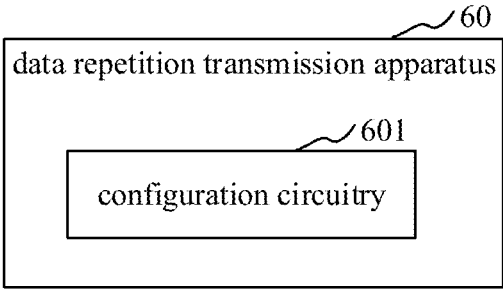
FIG. 6 is a structural diagram of a data repetition transmission apparatus according to an embodiment.

Referring to FIG. 6, FIG. 6 is a structural diagram of a data repetition transmission apparatus 60 according to an embodiment.

The apparatus 60 includes a configuration circuitry 601 configured to configure repetition transmission number information statically or semi-statically for a UE, to make the UE determine a number of repetition transmissions for data transmission based on the repetition transmission number information and perform data transmission with the network using the determined number of repetition transmissions.

More details of working principles and working modes of the apparatus 60 as shown in FIG. 6 can be referred to related descriptions of the method as shown in FIG. 4 and are not repeated here.

In some embodiments, the apparatus 60 may correspond to a chip with a data transmission function in a network device, or to a chip with a data processing function, such as an SOC or a baseband chip, or to a chip module including a chip with a data transmission function in the network device, or to a chip module including a chip with a data processing function, or to the network device. For example, the network device may include a base station.

In some embodiments, each module/unit of each apparatus and product described in the above embodiments may be a software module/unit or a hardware module/unit or may be a software module/unit in part, and a hardware module/unit in part.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a storage medium having computer instructions stored therein is provided, wherein when the computer instructions are executed by a processor, the above method is performed. In some embodiments, the storage medium may be a computer readable storage medium, such as including a non-volatile or a non-transitory memory, or include an optical disk, a magnetic disk or a solid disk.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor, or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including the apparatus 50 as shown in FIG. 5 or including a memory and a processor is provided, wherein the memory has a computer program stored therein, and when the processor executes the computer program, the above method as shown in FIG. 3 is performed. The terminal may include but not limited to a mobile phone, a computer, or a tablet computer.

In an embodiment of the present disclosure, a base station including the apparatus 60 as shown in FIG. 6 or including a memory and a processor is provided, wherein the memory has a computer program stored therein, and when the processor executes the computer program, the above method as shown in FIG. 4 is performed.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

The invention claimed is:

1. A data repetition transmission method, performed by a terminal and comprising:

determining a number of repetition transmissions for data transmission based on repetition transmission number information statically or semi-statically configured by a network; and performing data transmission with the network using the determined number of repetition transmissions;

wherein the number of repetition transmissions for data transmission is the number of repetition transmissions of Physical Uplink Shared Channel (PUSCH) in a connected state, and the number of repetition transmissions of PUSCH in the connected state is determined based on a number of repetition transmissions of a message 3 during a random access procedure; or wherein the number of repetition transmissions for data transmission is the number of repetition transmissions of Physical Downlink Shared Channel (PDSCH) in a connected state, and the number of repetition transmissions of PDSCH in the connected state is determined based on a number of repetition transmissions of a random access response message during a random access procedure.

2. The method according to claim 1, wherein prior to determining the number of repetition transmissions for data transmission based on the repetition transmission number information statically or semi-statically configured by the network, the method further comprises:

receiving first system information or first Radio Resource Control (RRC) signaling, wherein the first system information or the first RRC signaling carries the repetition transmission number information.

3. The method according to claim 1, wherein prior to determining the number of repetition transmissions for data transmission based on the repetition transmission number information statically or semi-statically configured by the network, the method further comprises:

receiving a message 4 during a random access procedure, wherein the message 4 carries the repetition transmission number information.

4. The method according to claim 1, further comprising:

indicating, during transmission of PUSCH, information of Timing Advance (TA) adjustment using Downlink Control Information (DCI) that schedules PUSCH.

5. A non-transitory storage medium storing one or more programs, the one or more programs comprising computer instructions, which, when executed by a processor, cause the processor to:

determine a number of repetition transmissions for data transmission based on repetition transmission number information statically or semi-statically configured by a network; and perform data transmission with the network using the determined number of repetition transmissions;

wherein the number of repetition transmissions for data transmission is the number of repetition transmissions of Physical Uplink Shared Channel (PUSCH) in a connected state, and the number of repetition transmissions of PUSCH in the connected state is determined based on a number of repetition transmissions of a message 3 during a random access procedure; or wherein the number of repetition transmissions for data transmission is the number of repetition transmissions of Physical Downlink Shared Channel (PDSCH) in a connected state, and the number of repetition transmissions of PDSCH in the connected state is determined based on a number of repetition transmissions of a random access response message during a random access procedure.

6. A terminal, comprising: a memory and processor, wherein the memory stores one or more programs, the one or more programs comprising computer instructions, which, when executed by the processor, cause the processor to:

determine a number of repetition transmissions for data transmission based on repetition transmission number information statically or semi-statically configured by a network; and perform data transmission with the network using the determined number of repetition transmissions;

wherein the number of repetition transmissions for data transmission is the number of repetition transmissions of Physical Uplink Shared Channel (PUSCH) in a connected state, and the number of repetition transmissions of PUSCH in the connected state is determined based on a number of repetition transmissions of a message 3 during a random access procedure; or wherein the number of repetition transmissions for data transmission is the number of repetition transmissions of Physical Downlink Shared Channel (PDSCH) in a connected state, and the number of repetition transmissions of PDSCH in the connected state is determined based on a number of repetition transmissions of a random access response message during a random access procedure.

7. The terminal according to claim 6, wherein the processor is further caused to:

receive first system information or first Radio Resource Control (RRC) signaling, wherein the first system information or the first RRC signaling carries the repetition transmission number information.

8. The terminal according to claim 6, wherein the processor is further caused to:

receive a message 4 during a random access procedure, wherein the message 4 carries the repetition transmission number information.

\* \* \* \* \*